(12) United States Patent
Kelley et al.

(10) Patent No.: US 6,764,097 B2
(45) Date of Patent: Jul. 20, 2004

(54) OPENING DEVICE FOR A COLD GAS INFLATOR

(75) Inventors: Michael Eugene Kelley, Valrico, FL (US); William Francis McLeod, II, Riverview, FL (US); Anthony J. Curtis, Palm Harbor, FL (US); Michael Felix Mulville, Bartow, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 113 days.

(21) Appl. No.: 10/262,976

(22) Filed: Oct. 3, 2002

(65) Prior Publication Data

US 2003/0111832 A1 Jun. 19, 2003

Related U.S. Application Data

(63) Continuation-in-part of application No. 10/017,022, filed on Dec. 14, 2001, now Pat. No. 6,629,703.

(51) Int. Cl.$^7$ .............................. B60R 21/26
(52) U.S. Cl. ................... 280/737; 137/68.13
(58) Field of Search ................. 280/737, 736, 280/741; 137/68.13

(56) References Cited

U.S. PATENT DOCUMENTS

| | | | |
|---|---|---|---|
| 3,567,245 A | 3/1971 | Ekstrom | 280/150 |
| 3,731,948 A | 5/1973 | Risko | 280/150 |
| 3,777,772 A | 12/1973 | Arnold et al. | 137/68 |
| 3,834,729 A | 9/1974 | Oka et al. | 280/150 |
| 3,854,491 A | 12/1974 | Bryan et al. | 137/1 |
| 3,961,806 A | 6/1976 | Katter | 280/150 |
| 5,022,674 A | 6/1991 | Frantom et al. | 280/741 |
| 5,076,312 A | 12/1991 | Powell | 137/68.1 |
| 5,388,322 A | 2/1995 | Simon | 29/525 |
| 5,531,473 A | 7/1996 | Rink et al. | 280/737 |
| 5,542,702 A | 8/1996 | Green et al. | 280/737 |
| 5,609,362 A | 3/1997 | Sparks et al. | 280/741 |
| 5,720,495 A | 2/1998 | Faigle et al. | 280/737 |
| 5,803,493 A * | 9/1998 | Paxton et al. | 280/737 |
| 5,826,904 A | 10/1998 | Ellis et al. | 280/737 |
| 5,879,025 A | 3/1999 | Blumenthal | 280/741 |
| 5,893,583 A | 4/1999 | Blumenthal et al. | 280/737 |
| 5,941,562 A | 8/1999 | Rink et al. | 280/737 |
| 6,131,948 A | 10/2000 | Cuevas | 280/737 |
| 6,152,484 A | 11/2000 | Fischer et al. | 280/737 |
| 6,206,414 B1 * | 3/2001 | Cook et al. | 280/737 |
| 6,217,065 B1 | 4/2001 | Al-Amin et al. | 280/737 |
| 6,221,186 B1 | 4/2001 | Rink et al. | 149/1 |
| 6,227,562 B1 | 5/2001 | Shirk et al. | 280/730.2 |
| 6,247,725 B1 | 6/2001 | Moller | 280/737 |
| 6,273,186 B1 | 8/2001 | Ognibene et al. | 165/185 |
| 6,328,336 B1 | 12/2001 | Takahashi et al. | 280/737 |
| 6,412,811 B1 | 7/2002 | Campbell et al. | 280/730.2 |
| 6,554,315 B2 * | 4/2003 | Freesmeier | 280/737 |

FOREIGN PATENT DOCUMENTS

| | | |
|---|---|---|
| DE | 4410574 | 10/1994 |
| DE | 10038676 | 4/2001 |
| WO | WO 01/42047 | 6/2001 |

* cited by examiner

Primary Examiner—Peter C. English
(74) Attorney, Agent, or Firm—Jarett Rieger; Lonnie Drayer

(57) ABSTRACT

A cold gas inflator has a pressure vessel made of first and second cylindrical members that are joined by friction welding, the friction welding producing curls that serve to preclude an orifice plate from sliding into the second cylindrical member. The cold gas inflator is filled with stored gas. The cold gas inflator has a burst disk, which prevents the stored gas from exiting the pressure vessel. In the event of an automobile accident, an opening device is actuated, which causes the ignition of pyrotechnic material. This ignition generates a shockwave of sufficient energy to rupture a burst disk. The stored gas flows from the cold gas inflator in a radial direction.

18 Claims, 4 Drawing Sheets

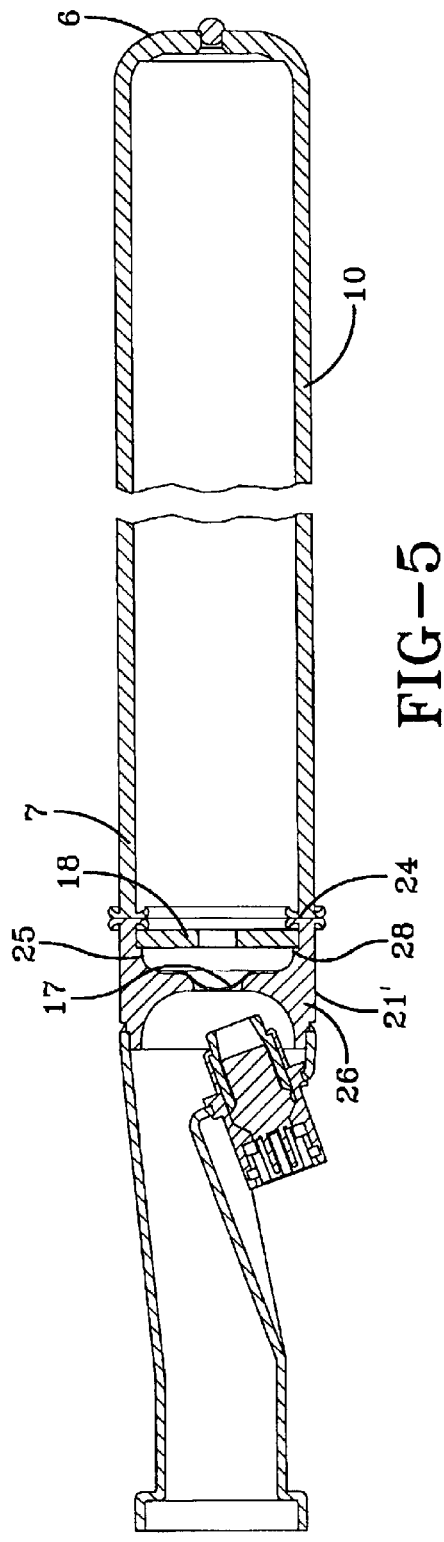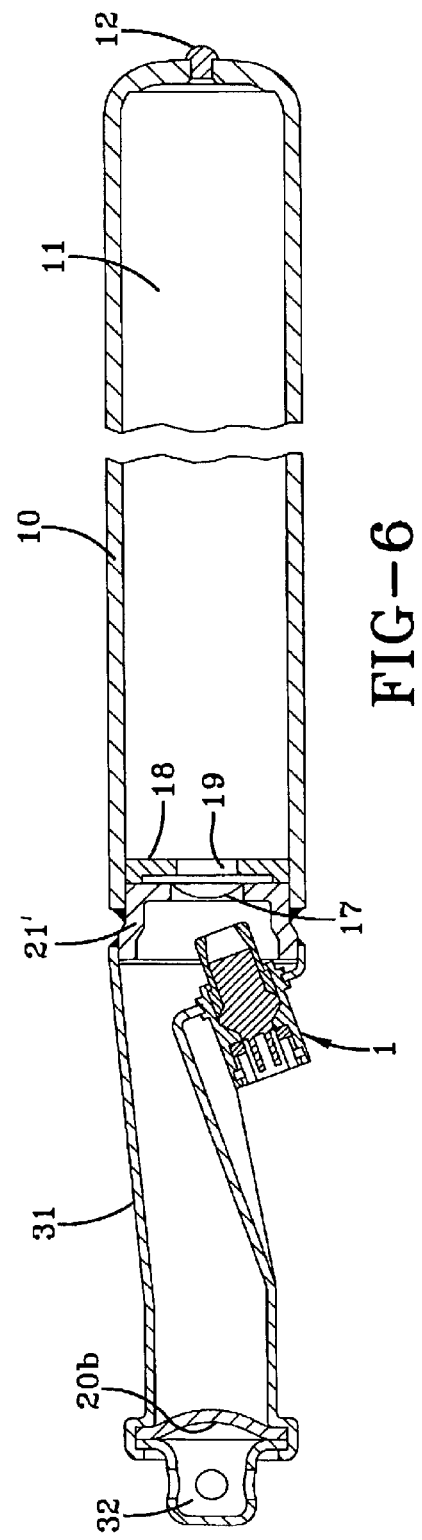

OPENING DEVICE FOR A COLD GAS INFLATOR

This is a continuation in part of application Ser. No. 10/017,022 filed Dec. 14, 2001, now U.S. Pat. No. 6,629,703.

FIELD OF THE INVENTION

The present invention relates generally to safety devices to protect occupants of moving vehicles. More particularly, the present invention relates to an opening device for a cold gas inflator.

BACKGROUND OF THE INVENTION

The ability of a gas storage device to rapidly release gas is a very important feature in various technologies. Examples of such technologies include vehicle occupant inflatable restraints, fire suppression systems, and emergency air containers.

In the field of vehicle occupant inflatable restraints, the cold gas inflator inflates a vehicle airbag by releasing stored gas. The stored gas generally comprises one or more inert gases such as argon or helium, and in the event of an automobile crash, the stored gas exits the cold gas inflator and flows into an airbag, which causes the airbag to inflate. Since cold gas inflators release stored gas, these inflators do not have the problems typically associated with other types of inflators such as toxic gas and hot inflation gas.

Cold gas inflators are suitable for use in inflating curtain, thorax, and head and thorax airbags. Curtain airbags are mounted in the roof of a vehicle and when inflated, protect the occupant's head. Thorax airbags are mounted lower than curtain airbags and are generally mounted in vehicle seats.

Cold gas inflators are equipped with a discharge opening, and the stored gas must travel through this passageway to exit the pressure vessel. Typically, the discharge opening has a blocking member, which prevents the stored gas from passing through the discharge opening and escaping the pressure vessel. During an automobile crash, an opening device must quickly remove the blocking member to allow the airbag to be rapidly deployed. It is paramount that the opening device be reliable so that the actuation of an opening device always yields an unblocked discharge opening. Along with being reliable, it is desirable for the opening device to be made from as few parts as possible. As an example, an opening device operates by removing a support for a sealing element. Once the sealing element loses its support, the sealing element ceases to block the discharge opening and the stored gas is able to flow through the discharge opening. This type of opening device is known from U.S. Pat. No. 6,247,725 B1. Another type of opening device works by generating a shock wave. The inflator in WO 01/42047 A2 uses a shock wave to open a burst disk, which causes the stored gas to escape from the gas vessel. The inflator in U.S. Pat. No. 5,022,674 also uses a shock wave to break the disk permitting inflation gas to exit the pressure vessel.

SUMMARY OF THE INVENTION

In the present invention, the cold gas inflator includes first and second cylindrical members joined together by friction welding to provide a pressure vessel. The friction welding produces curls that serve to preclude an orifice plate from sliding into the second cylindrical member. An opening device is provided for unblocking a discharge opening. The discharge opening is blocked with a burst disk, and the burst disk has a dome-shape configuration. The opening device for the present invention is an igniter with an ignition material arid a nozzle, which both retains the igniter to the igniter end cap and also focuses the output energy of the igniter greatly increasing the reliable opening of the burst disk. Actuation of the igniter results in the generation of a shock wave, which has enough energy to fully rupture the burst disk. Once the burst disk has been ruptured, the stored gas is not obstructed by the burst disk and is able to leave the inflator by flowing through the discharge opening.

According to one aspect of the invention, the cold gas inflator is provided with an orifice plate to restrict the flow of stored gas through the discharge opening.

Another aspect of the invention includes an axial flow coupler to direct the stored gas out of the cold gas inflator in an axial direction as oppose to a radial direction. In this embodiment, the gas flows away from the inflator along the longitudinal axis of the inflator. In this embodiment, the acute angle formed between the longitudinal axis of the opening device and the longitudinal axis of the inflator is greater than 10°.

In a further aspect of the invention, the cold gas inflator has axial flow elbow to direct the stored gas out of the inflator in an axial direction. With the axial flow elbow, the stored gas does not flow along the longitudinal axis of the inflator.

BRIEF DESCRIPTION OF THE DRAWINGS

Additional features of the invention result from the additional claims, description, and drawing, in which the exemplary embodiments of the invention are described in detail in the following:

FIG. 5 is another embodiment of the axial flow cold gas inflator in FIG. 4.

FIG. 6 is similar to FIG. 4 except that the cold gas inflator has a flow diverter.

DETAILED DESCRIPTION OF THE INVENTION

Figure 1:
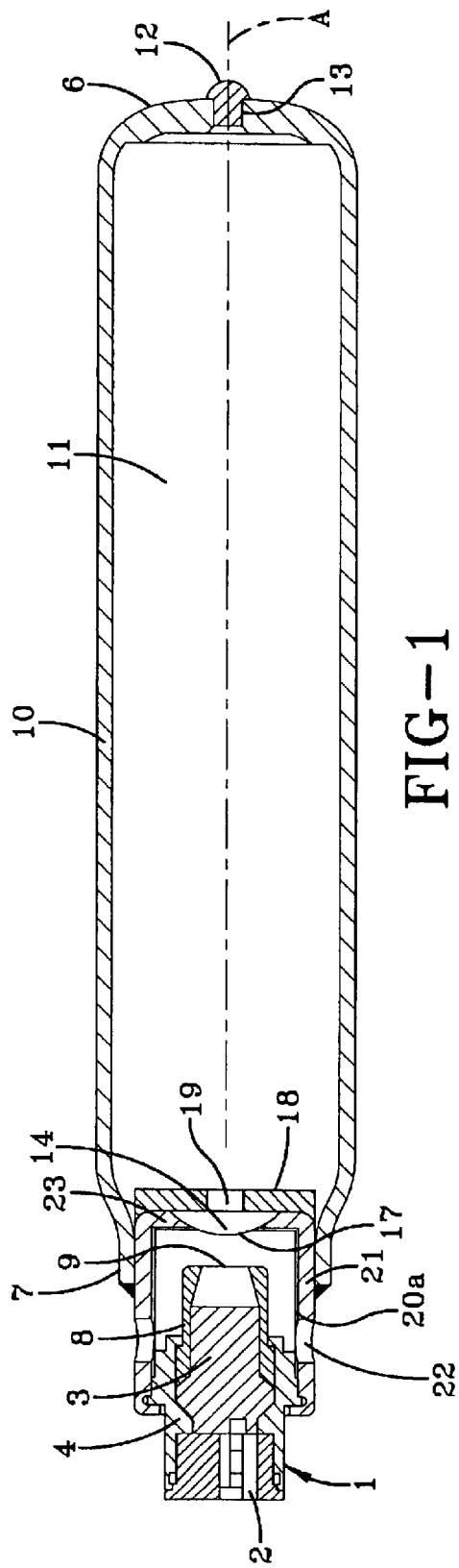
FIG. 1 is a cross sectional schematic diagram of a radial flow cold gas inflator.

FIG. 1 shows an exemplary cold gas inflator for use in an automotive safety restraint system. The cold gas inflator has a first cylindrical member 21 attached to a second cylindrical member 10. A burst disk is fixedly attached to the first cylindrical member, whereby the burst disk, the first cylindrical member, and the second cylindrical member define a pressure vessel. The pressure vessel is filled with stored gas 11, which is released from the inflator during an automobile crash to inflate a vehicle airbag. The second cylindrical member 10 has a generally cylindrical shape with a circular cross section. The second cylindrical member 10 may be formed of stainless steel, low carbon steel, or any other suitable material, which has sufficient strength and extremely low permeability to the stored gas.

The ideal characteristics for the stored gas 11 are that the gas is inert, is not highly temperature sensitive, and has a high inflation speed. According to the present invention, the storage pressure of the inert gas is approximately 9000 psi (62053 kPa) It is possible to design a cold gas inflator that operates properly under a pressure between 500 psi (3447 kPa) and 12000 psi (82740 kPa) using either an inert or diatomic gas.

The stored gas can include one or more gases, which include argon, neon, xenon, helium and nitrogen. Preferably, the stored gas consists of a 100% helium. The pressure vessel may be filled with a mixture of argon and helium gas.

The pressure vessel is filled with stored gas 11 through the gas fill port 13 in the first end 6 of the second cylindrical vessel. The gas fill port is sealed by a plug 12 made from carbon steel to prevent gas from escaping after the pressure vessel has been filled to the desired pressure. It is preferred that the plug is secured to the gas fill port 13 by a resistance weld, but one skilled in the an realizes that other types of welding could be utilized to fuse the plug 12 to the second cylindrical member 10. The gas fill port 13 is located on a first end 6 of the second cylindrical member 10, and a first cylindrical member 21 is connected to the second end 7 of the second cylindrical member 10.

Figure 2:
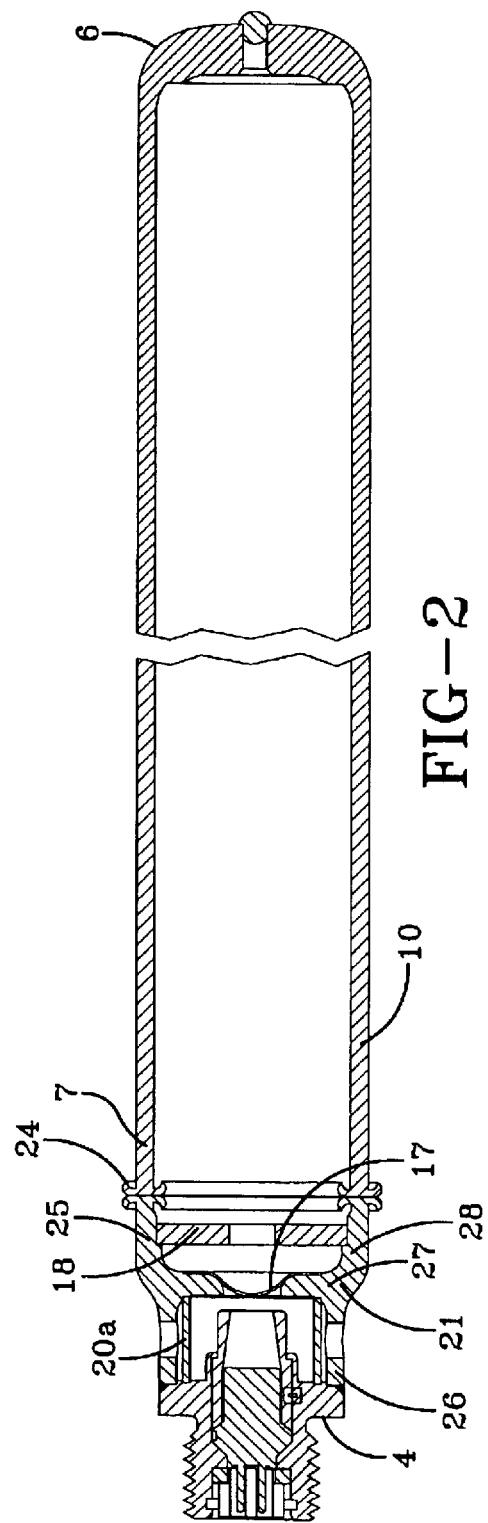
FIG. 2 is another embodiment of the radial flow cold gas inflator in FIG. 1.

With reference to FIG. 1, the opening device is attached to a first cylindrical member 21. The first cylindrical member 21 may be formed of stainless steel, low carbon steel, or any other suitable material having sufficient structural strength. The first cylindrical member 21 is telescopically inserted into the second cylindrical member 10. The first cylindrical member 21 is connected to the second cylindrical member 10 by a circumferential weld, preferably a TIG (tungsten inert gas) weld, but other suitable welding techniques may be employed. In FIG. 2, the first cylindrical member 21 and the second cylindrical member 10 are attached to one another in a different manner than in FIG. 1. The pressure vessel portion 25 of the first cylindrical member 21 is friction welded to the second end 7 of the second cylindrical member 10. The pressure vessel portion 25 of the first cylindrical member 21 and the second cylindrical member 10 have substantially the same radius. As a result of the friction welding process, curls 24 are formed from the displaced metal that extend both outward and inward from the butt joint. The cold gas inflators show two approaches to attaching the first cylindrical member 21 and the second cylindrical member 10, however, one skilled in the art appreciates that other approaches may be employed such as telescopically inserting the second end 7 of the second cylindrical member 10 into the first cylindrical member 21.

As seen in FIG. 1, the burst disk 17 is attached to the legs 23 of the first cylindrical member 21. The legs 23 of the first cylindrical member 21 are referred to as "legs" because this structure partially resembles "legs" when viewed under a cross section. The burst disk 17 has a flat shape, but the burst disk flexes towards the opening device 1 when the pressure vessel is filled. The inner most portion of the legs 23 have a curvilinear shape and the burst disk adopts a complimentary shape thereto during the filling of the pressure vessel with gas. The stored gas 11 applies uniform force against the burst disk resulting in its dome shape configuration. In order to decrease the filling time for the pressure vessel, the legs 23 are able to bend during the filling of the pressure vessel thus distributing the load to the burst disk 17 during filling. After filling of the pressure vessel, the legs 23 do not return to their original shape. Preferably, the legs 23 bend approximately 4 degrees. Instead of relying on the stored gas to bulge the burst disk, the burst disk may be pre-formed or pre-bulged before being attached to the legs 23 of the first cylindrical member 21. An example of a process of pre-forming the burst disk is the hydro-forming process. Utilizing the pre-forming method, the gas fill rate for the pressure vessel may be increased without risk of pro-maturely tailing the burst disk 17. As shown in FIG. 2, the burst disk 17 is attached to the annular end plate 27 of the pressure vessel portion 25.

A burst disk 17 seals the discharge opening 14 and prevents the stored gas 11 from escaping the pressure vessel after it is titled with gas. The legs 23 of the first cylindrical member 21 define the discharge opening 14. For the present invention, the burst disk must meet the following constraints. The burst disk must survive 1.1 times production fill rate or greater. The burst disk must meet USCAR 4500 pressure cycles with no helium leak. The burst disk must open reliably at −40° C. Lastly, the burst disk must hydro-burst at a minimum pressure of 1.25 times the proof pressure and a maximum of 0.8 times the minimum pressure vessel hydro-burst pressure. According to the present invention, the burst disk may be made from stainless steel, nickel-chromium alloys such as INCONEL, nickel-copper alloys such as MONEL, or any other suitable material that meets the aforementioned constraints. The hardness of the burst disk should be between "half hard" and "full hard" to minimize burst disk thickness. Hardness is the degree to which a metal will resist cutting, abrasion, penetration, bending and stretching. The indicated hardness of metals will differ somewhat with the specific apparatus and technique of measuring. The preferred thickness for the burst disk is 0.203 mm for 41,370 kPa ambient fills and 0.254 mm for 62053 kPa ambient fills. The burst disk is attached to the first cylindrical member 21 by a YAG Laser but could be attached by other welding techniques.

The opening device 1 comprises an electrically actuated igniter 3, an end cap 4, and optionally an igniter nozzle 8. The opening device 1 is positioned so that the longitudinal axis of the opening device is essentially parallel with a longitudinal axis of the first cylindrical member 10. The igniter 3 communicates with a central processing unit (not shown), which in turn communicates with a sensor means (not shown). The sensor means can be of any type presently used in the art to sense a collision or sudden deceleration of a vehicle. The electric firing pins 2 are insulated from one another and connected by a bridge wire (not shown). The bridge wire is preferably embedded in one or more layers of pyrotechnic compositions designed to generate a shockwave to rupture the burst disk 17. An example of a suitable pyrotechnic composition or ignition material for the present invention is zirconium potassium perchlorate or ZPP, however, one skilled in the art realizes that other ignition material could be used in the present invention. Examples of igniter suppliers include SDI and EMS-Patvag. The preferred embodiment for the present invention has a bridge wire igniter, but a semiconductor bridge igniter or a smart igniter can also be used.

An end cap 4 houses the igniter 3. As displayed in FIG. 1, the end cap 4 is crimped to the first cylindrical member 21. In contrast, the cold gas inflator as seen in FIG. 2 shows the end cap 4 being welded to the first cylindrical member 21. The preferred welding type is MIG weld, but it is appreciated that other welding types may be employed. Also, the igniter can be connected by screwing or other suitable attachment means without departing from the scope of the present invention.

The opening device 1 may also comprise an igniter nozzle 8 for directing an output energy from the ignition of the ignition material towards the burst disk 17. As shown in FIG. 1, the nozzle is tapered inward in the direction of the burst disk 17. Without the igniter nozzle 8, the igniter would still rupture the burst disk 17 but will need to be loaded with extra ignition material. It is also possible to utilize an igniter with reinforced walls, which would eliminate the need for a nozzle 8. These reinforcement walls would act in a similar fashion to the nozzle 8 by focusing the output energy in the direction of the burst disk 17.

With reference to FIG. 1, the nozzle 8 is attached to the end cap 4 by crimping, but other methods of attachment are suitable such as press fit or welding. The nozzle is preferably made from standard carbon steel and has an opening 9 that is less than the size of the discharge opening 14, with a preferred range of 2 mm to 8 mm.

Upon the detection of a crash or a sudden deceleration, the burst disk 17 is ruptured by the opening device 1. As discussed above, the ignition material is ignited by a bridgewire. The explosion of the ignition material generates a shockwave that breaks apart the burst disk 17. In order for the burst disk 17 to rupture, the opening device 1 is disposed less than 8.0 mm away from a center of the fully domed burst disk. Once the burst disk 17 is opened, stored gas from the pressure vessel escapes through the outlet vents 22 in a radial direction. The cold gas inflator has a fragment screen 20a to capture fragments from the ruptured burst disk so that these fragments will not wind up in the airbag. With reference to FIG 2, the first cylindrical member 21 has a conduit portion 26 comprising a plurality of outlet vents 22 around the circumference thereof. The fragment screen 20a shown in FIG. 2 is disposed between the end cap 4 and the end plate 27 of the pressure vessel portion 25.

There are several methods of controlling the gas flow rate. One method of controlling the gas flow rate is to increase/decrease the diameter of the outlet vents 22. Another method is to increase/decrease the diameter of the discharge opening 14. Lastly, a regulating orifice plate 18 can be installed in the second cylindrical member 10 to control the rate of gas discharge. In FIG. 1, the orifice plate 18 is mounted flush against the first cylindrical member 21 and secured thereto by laser welding. The stored gas 11 flows through the orifice 19 of the orifice plate 18. The area of the orifice 19 is smaller than the area of the discharge opening 14. In the cold gas inflator depicted in FIG. 2, the orifice plate is installed on a ledge 28 of the pressure vessel portion 25 of the first cylindrical member 21. Unlike the orifice plate in FIG. 1, the orifice plate 18 is not welded to the first cylindrical member 21. The orifice plate is prevented from contacting the end plate 27 by an annular ledge 28. Moreover, the orifice plate is prevented from sliding toward the second cylindrical member 10 because of the curls 24.

Figure 3:
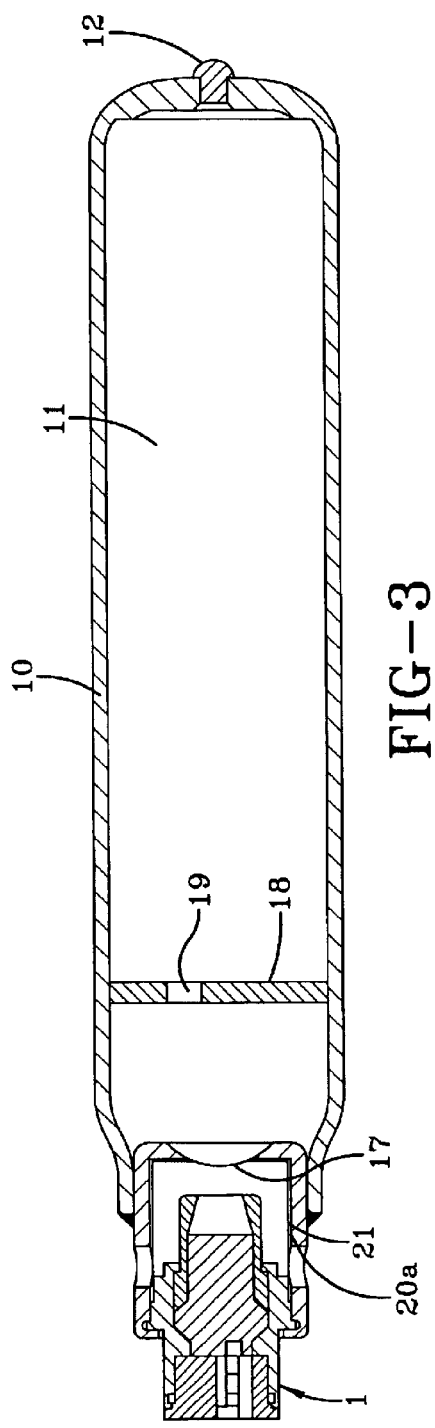
FIG. 3 is similar to FIG. 1 except that the orifice plate is located further upstream in the pressure vessel.

FIG. 3 shows an alternate embodiment where the orifice plate 18 is installed upstream in the second cylindrical member 10. The presence of a upstream orifice plate 18 affects the flow rate of the stored gas 11 through the discharge opening 14 since the discharge opening 14 has a greater area than the orifice 19. A first quantity of stored gas 11, which is the stored gas 11 between the discharge opening 14 and the orifice plate 18, flows through the discharge opening 14. On the other hand, a second quantity of stored gas 11, which is stored gas 11 between the orifice plate 18 and the first end 6, must flow through both the orifice 19 and the discharge opening 14. It is preferred that the orifice plate 18 be disposed in a position closer to the second end 7 of the second cylindrical member 10 than the first end 6 thus limiting the amount of unthrottled gas. By doing so the initial onset of the pressure time curve may be reduced thus aiding the inflator in meeting out of position requirements during occupant level testing.

Figure 4:
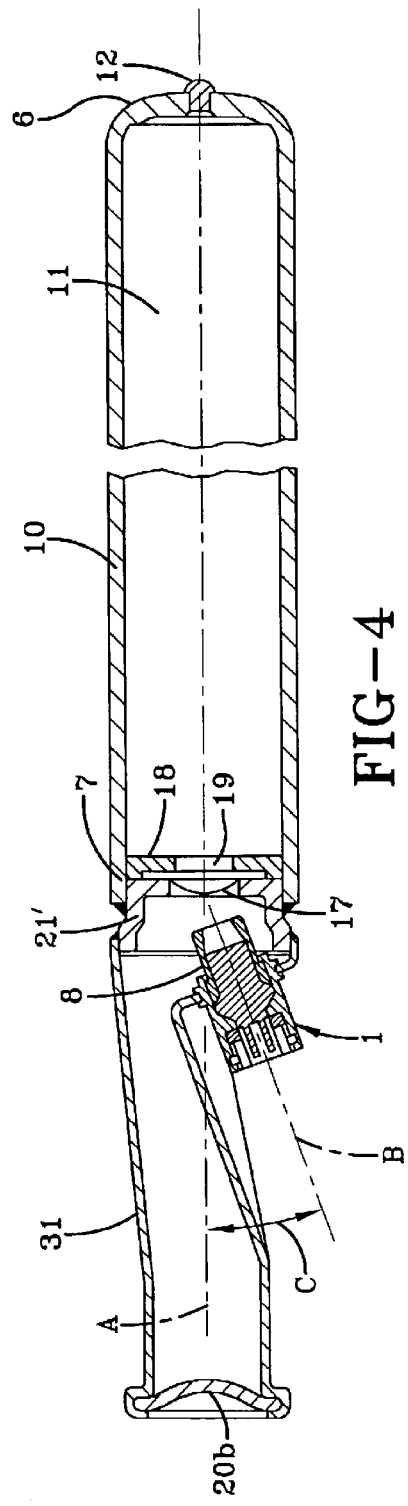
FIG. 4 is a cross sectional schematic diagram of an axial flow cold gas inflator.

An axial flow cold gas inflator is shown in FIG. 4. Unlike the radial flow cold gas inflator, the axial flow cold gas inflator has an opening device mounted at angle C. As shown in FIG. 4, angle C is the acute angle formed by the interception of the longitudinal axis B of the opening device and the longitudinal axis A of the second cylindrical member 10. The opening device could be mounted at any angle C, but the preferred angle C is greater than 10°.

By mounting the opening device at an angle, a large flow area is allowed for the escaping gas in the axial direction which allows for superior packaging schemes over conventional radial flow concepts which convert the gas to axial flow via an external manifold (not shown). It is preferred that the opening device 1 is recessed within the axial flow coupler 31 so that no portion of the opening device 1 extends beyond the cross-section of the second cylindrical member 10.

The axial flow cold gas inflators depicted in FIGS. 4 and 5 operate in the same manner but have sightly different designs. In FIG. 4, the first cylindrical member 21' is telescopically inserted into the second cylindrical member 10, and the two parts are welded together. On the other hand, in FIG. 5 the first cylindrical member 21' is friction welded to the second cylindrical member 10 requiring the portions of the two parts welded together have substantially the same radius. In FIG. 4, the orifice plate 18 is laser welded to the first cylindrical member, whereas the orifice plate 18 in FIG. 5 is secured in place due to a ledge 28 and the curls 24, which was discussed above.

The axial flow cold gas inflator has an opening device that is similar to the opening device for FIG. 1, which was discussed above. Upon rupturing of the burst disk 17, the stored gas 11 is first directed in an axial direction via the conduit portion 26 of the first cylindrical member 21' and is further directed in the same direction via the axial flow coupler 31. The stored gas then passes through the optional fragment screen 20b at the end of the axial flow coupler. The axial flow coupler directs the gas to flow in an axial direction as it exits the cold gas inflator. In order to adhere to Department of Transportation regulations, the axial flow cold gas inflator can have a flow diverter 32 attached to the end of the axial flow coupler 31 as shown in FIG. 6. The flow diverter 32 changes the gas flow of the cold gas inflator from axial flow to radial flow.

Figure 7:
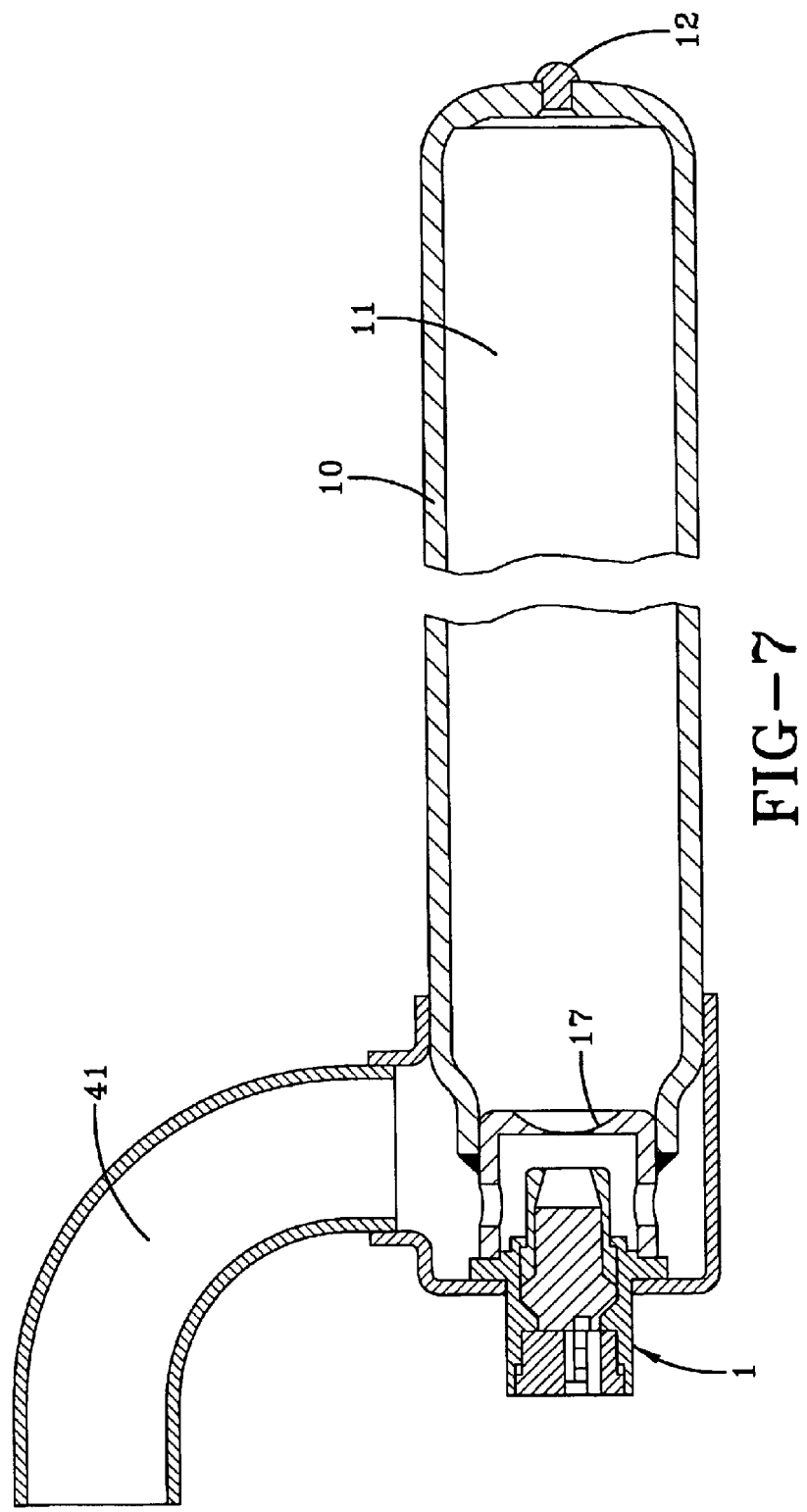
FIG. 7 is a cross sectional schematic diagram of a cold gas inflator with an axial flow elbow.

An alternative embodiment for the axial flow inflator is presented in FIG. 7. The cold gas inflator is of radial design and has an axial flow elbow 41 externally attached to the inflator to convert the gas flow from radial to axial. The stored gas 11 travels from the second cylindrical member 10 to the axial flow elbow 41 and into an airbag cushion (not shown). The direction of the flowing gas from the axial flow elbow 41 is parallel to the longitudinal axis A of the second cylindrical member 10; however, the gas exiting the cold gas inflator does not overlap the longitudinal axis A of the second cylindrical member 10.

Many changes and modifications in the above-described embodiment of the invention can, of course, be carried out without departing from the scope thereof. Accordingly, that scope is intended to be limited only by the scope of the appended claims.

We claim:

1. An inflator comprising:
 a first cylindrical member having a pressure vessel portion and a conduit portion for directing inflation gas, the pressure vessel portion has an annular end plate extending radially inward defining a discharge opening;

a second cylindrical member having a first end that is closed and a second end that is fused to the pressure vessel portion of the first cylindrical member by friction welding whereby curls are formed therefrom;

a burst disk having a substantially dome shape with a peak of the dome facing away from the second cylindrical member, the burst disk is attached to the end plate, wherein the burst disk, the first cylindrical member and the second cylindrical member define a pressure vessel; and an orifice plate having an orifice therethrough wherein the orifice is smaller than the discharge opening, the first cylindrical member has an annular ledge disposed within the pressure vessel portion thereof for precluding the orifice plate from contacting the end plate, and the curls preclude the orifice plate from sliding into the second cylindrical member.

2. The inflator according to claim 1 wherein the center of the burst disk is less than 8.0 mm away from an opening device, the opening device comprising an igniter and a nozzle for focusing the output energy of the igniter.

3. The inflator according to claim 2 wherein the nozzle has an opening that is less than the size of the discharge opening, the opening in the nozzle has a diameter within a range of 2 mm to 8 mm.

4. The inflator according to claim 1 wherein the first end of the second cylindrical member has a fill port for filling the pressure vessel with gas.

5. The inflator according to claim 1 wherein an opening device is positioned so that a longitudinal axis of the opening device is essentially parallel with a longitudinal axis of the second cylindrical member.

6. The inflator according to claim 1 wherein the conduit portion of the first cylindrical member has a plurality of holes therethrough around the circumference thereof for diffusing the inflation gas in directions.

7. The inflator according to claim 1 wherein the conduit portion of the first cylindrical member directs inflation gas from the pressure vessel in essentially a parallel direction to a longitudinal axis of the second cylindrical member.

8. The inflator according to claim 7 wherein an opening device is positioned at a non-zero angle relative to the longitudinal axis of the second cylindrical member.

9. The inflator according to claim 8 wherein an acute angle formed between a longitudinal axis of the opening device and the longitudinal axis of the second cylindrical member is greater than 10°.

10. The inflator according to claim 7 further comprising an axial flow coupler for further directing the flow of stored gas from the pressure vessel in a direction parallel to the longitudinal axis of the second cylindrical member, the axial flow coupler is adjacent to the first cylindrical member which is adjacent to the second cylindrical member.

11. The inflator according to claim 10 wherein an opening device is recessed within the axial coupler so that no portion of the opening device extends beyond a width of the second cylindrical member.

12. The inflator according to claim 7 further comprising a flow diverter for diverting the gas flow to a direction that is essentially perpendicular to the longitudinal axis of the second cylindrical member.

13. An inflator for inflating an airbag comprising:

a pressure vessel containing gas comprising (a) a first cylindrical member having a pressure vessel portion and a conduit portion for directing inflation gas, the pressure vessel portion has an annular end plate extending radially inward defining a discharge opening for the pressure vessel, (b) a second cylindrical member having a first end that is closed and a second end that is fused to the pressure vessel portion of the first cylindrical member, and (c) a burst disk having a substantially dome shape with a peak of the dome facing away from the second cylindrical member, the burst disk is attached to the end plate; and an opening device attached to the conduit portion of the first cylindrical member, wherein the center of the burst disk is less than 8.0 mm away from the opening device, the opening device comprises an igniter and a nozzle for focusing the output energy of the igniter, whereby actuation of the igniter produces combustion products that rupture the burst disk allowing inflation gas to flow through the discharge opening, wherein the pressure vessel has curls formed from the fusing of the pressure vessel portion of the first cylindrical member with the second cylindrical member and the first cylindrical member has an annular ledge disposed within the pressure vessel portion thereof for precluding an orifice plate from contacting the end plate, and the curls preclude the orifice plate from sliding into the second cylindrical member.

14. The inflator according to claim 13 wherein the nozzle has an opening that is less than the size of the discharge opening, the opening in the nozzle has a diameter within a range of 2 mm to 8 mm.

15. The inflator according to claim 13 wherein the conduit portion of the first cylindrical member directs inflation gas from the pressure vessel in essentially a parallel direction to a longitudinal axis of the second cylindrical member.

16. The inflator according to claim 13 wherein the opening device is positioned at a non-zero angle relative to a longitudinal axis of the second cylindrical member.

17. The inflator according to claim 16 wherein an acute angle formed between a longitudinal axis of the opening device and the longitudinal axis of the second cylindrical member is greater than 10°.

18. The inflator according to claim 16 further comprising an axial flow coupler for further directing the flow of stored gas from the pressure vessel in a direction parallel to the longitudinal axis of the second cylindrical member, the axial flow coupler is adjacent to the first cylindrical member which is adjacent to the second cylindrical member.

* * * * *